Nov. 12, 1968  G. L. MARTIN  3,409,926
BRUSH FOR CLEANING MILKING INFLATIONS
Filed Nov. 3, 1967   2 Sheets-Sheet 1
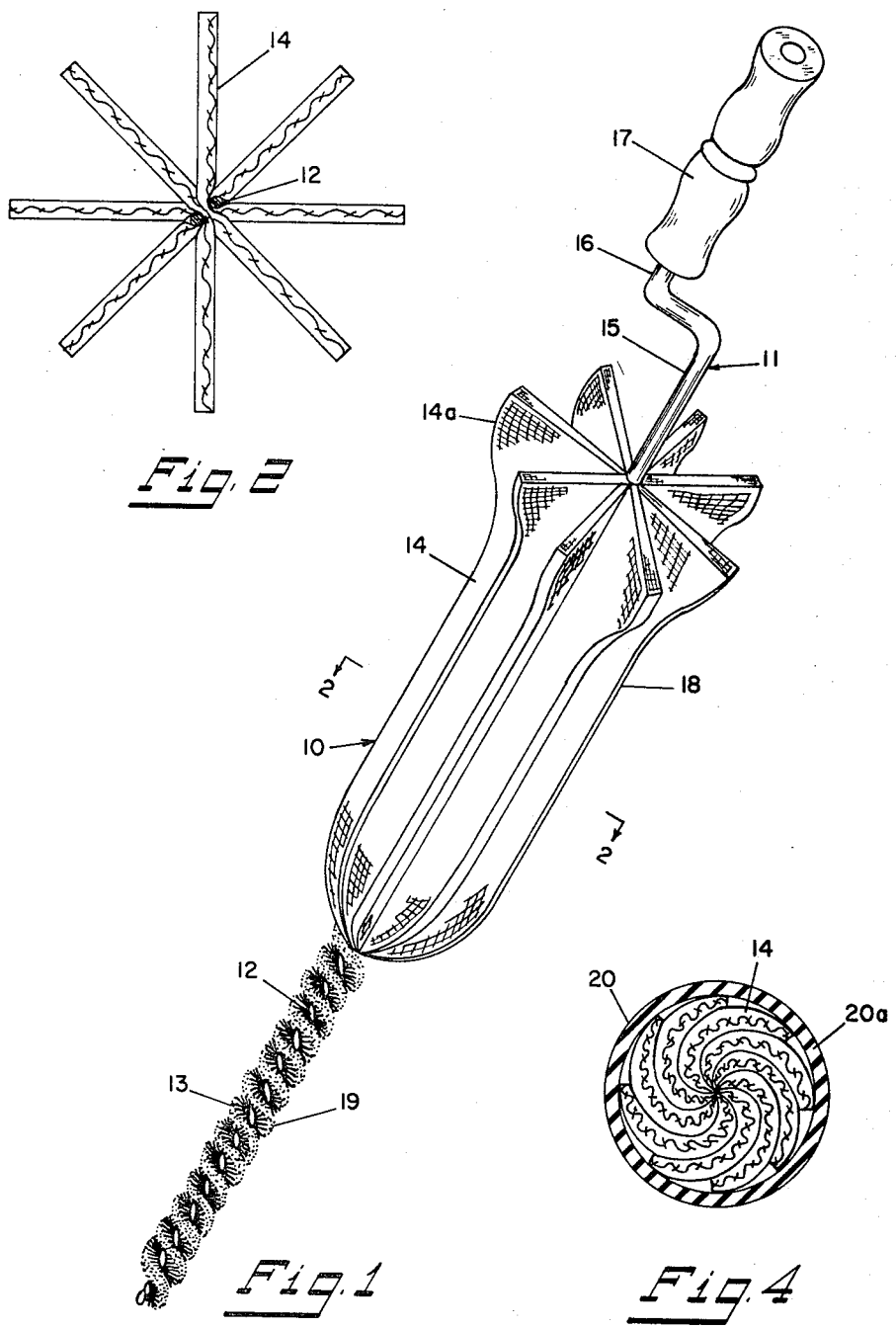
INVENTOR.
GOMER L. MARTIN
BY Joseph G. Werner
John M Winter
ATTORNEY

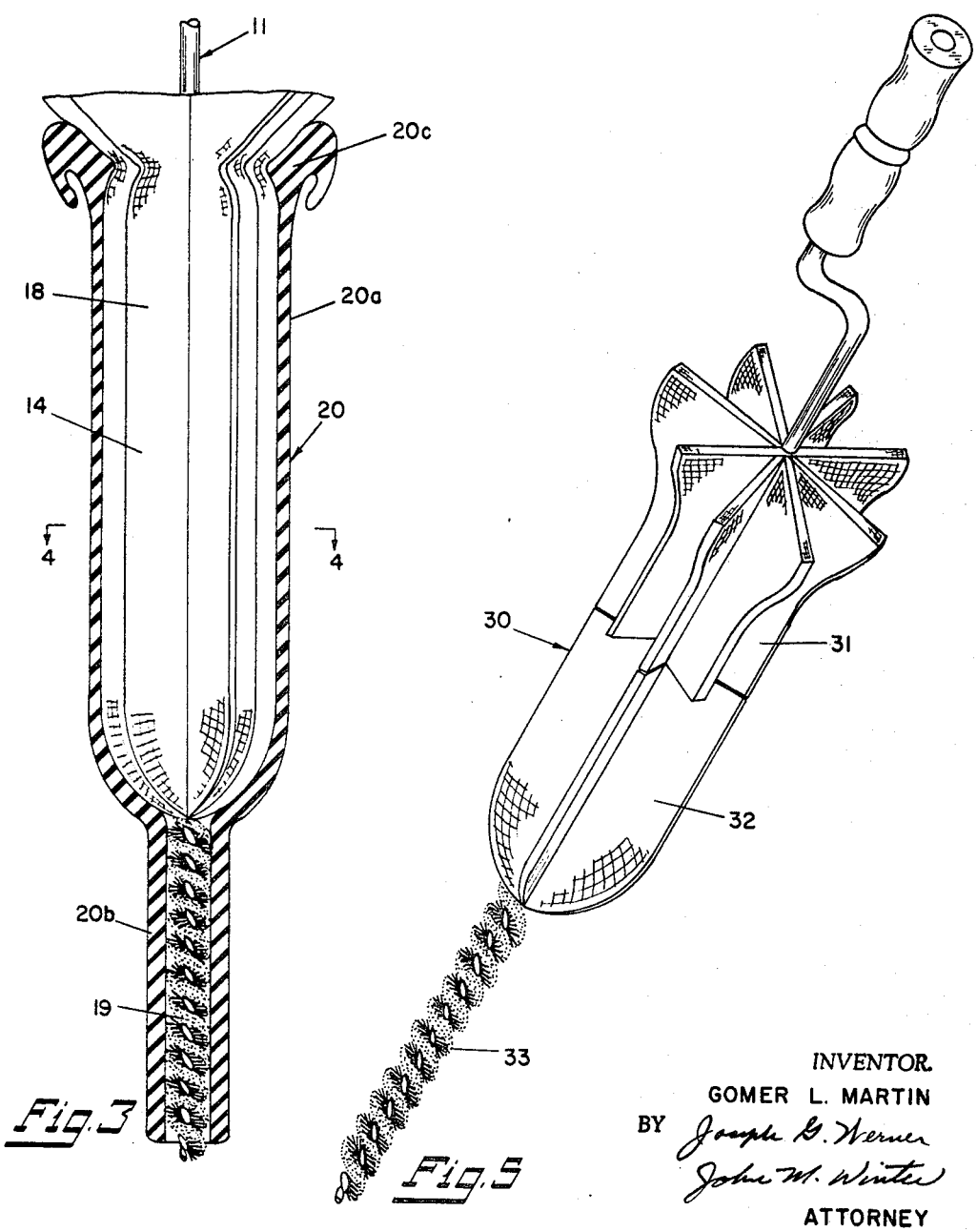

United States Patent Office 3,409,926
Patented Nov. 12, 1968

3,409,926
BRUSH FOR CLEANING MILKING
INFLATIONS
Gomer L. Martin, R.R. 1, Blue River, Wis. 53518
Filed Nov. 3, 1967, Ser. No. 680,377
2 Claims. (Cl. 15—114)

ABSTRACT OF THE DISCLOSURE

An inflation cleaning brush having an upper portion with a plurality of radially extending flexible webs secured to an elongate wire core. The webs are made of open, low-density sheets of tough, flexible, organic fibers. The webs fold backwardly one one another in overlapping supporting spiral relation when the brush is inserted with a rotary motion into the cup portion of the milking inflation. The lower portion of the brush is of conventional bristle construction for cleaning the milk tube portion of the inflation. The brush may have an intermediate webbed portion between the upper and lower portions. This intermediate portion has fewer radial webs than the upper portion to accommodate tapered cup portions.

BACKGROUND OF THE INVENTION

Field of the invention

This invention relates to brushes and more particularly to rotary brushes for cleaning milking machine inflations.

Description of the prior art

The importance of having clean milking inflations is, of course, well recognized. Improper cleaning greatly reduces inflation life and often gives rise to mastitis in the herd.

The inside of a rubber milking inflation is susceptible to accumulation of a characteristic whitish deposit, commonly called "milkstone," which becomes the breeding ground for bacteria and adversely influences the quality and flavor of milk.

The greatest enemy of milking inflations, however, is probably butterfat. Most butterfat absorption occurs in the teat-receiving cup portion of the inflation because of the pressure of the teat pushing the butterfat into the rubber. While most butterfat comes from the milk, some of it is derived from the fat absorbed from the skin of the cow's udder. This fat absorption substantially shortens the life of the inflation by destroying the rubber's characteristic physical qualities desirable for good milking.

Proper and thorough cleaning is the only way to reduce the damaging effects of milkstone accumulation and butterfat absorption.

The state of the inflation cleaning brush art is best represented by U.S. Patent Nos. 3,004,274 and 3,076,988. Both of these patents show motor driven spiral bristle brushes for cleaning milking machine inflations. Such bristle brushes have been used to clean inflations for many years and were believed to do the best job of anything available.

Summary of the invention

In contrast to conventional spiral bristle inflation brushes, my invention is basically a new form of brush comprised of radially extending flexible webs made of open, low-density sheets of tough, flexible material such as nylon or the like. The radial webs which are substantially longer than the inside radius of the cup portion of the inflation undergo a unique spiral roll-up action wherein they overlap one another in supporting relation when the brush is inserted with a rotary motion into a milking inflation. My new web-type brush has been demonstrated to provide substantially better cleaning quality than bristle-type brushes for removing butterfat and milkstone from the inside of rubber milking inflations.

When the brush is removed from the inflation, the webs unwind and resume their general radial position to facilitate cleaning of the low-density web material by merely washing and flushing with a suitable cleaning liquid.

Further objects, features and advantages of my invention will be apparent from the following detailed description taken in conjunction with the accompanying drawings showing several embodiments exemplifying the principles of my invention.

Brief description of the drawings

FIGURE 1 is a perspective view of an inflation cleaning brush embodying my invention.

FIGURE 2 is a cross-sectional view taken along section line 2—2 of FIGURE 1.

FIGURE 3 is a sectional view through the center of an inflation showing my brush therein.

FIGURE 4 is a sectional view taken along line 4—4 of FIGURE 3.

FIGURE 5 is a perspective view of a second embodiment of my invention.

Description of the preferred embodiments

Referring now more particularly to the drawings wherein like numerals refer to like parts throughout the several views, my new inflation cleaning brush is shown generally at 10 in FIGURE 1. The elongate central core 11 of the brush has a pair of metal wires 12 shown in FIGURES 1 and 2.

The wires 12 forming the core for the lower brush portion 19 are spirally wound tightly together in the well-known manner for securing bristles 13 therebetween in a spiral configuration. In the upper brush portion 18, the wires 12 are substantially parallel and secure a plurality of webs 14 tightly therebetween.

The top end of the core 11 above upper brush portion 18 preferably has a tubular element 15 encircling the wires 12 which are again wound in a tight spiral manner for rigidity. The upper end of the central core has two substantially right angle bends therein to form a handle section 16 which is parallel to the axis of the brush but offset laterally therefrom for rotating the brush. A wooden or plastic handle grip 17 is rotatably mounted on the handle portion 16 of the central core.

The upper brush portion 18 is formed of a plurality of radially extending webs 14, eight such webs are shown in the drawings for exemplification. The webs are formed of open, low-density sheets of flexible organic fibers. The middle of each sheet is tightly held between the pair of wires 12 of the central core of the brush as best shown in FIGURE 2. The wires should be of sufficient size so that the brush is not unduly flimsy. The portion of wires 12 holding the webs 14 in place may be wound about a turn on one another to provide increased rigidity and strength to the brush.

As best shown in FIGURE 1, the elongate webs 14 preferably flare outwardly somewhat at their upper end such as at 14a in FIGURE 1 for cleaning the enlarged mouth portion of a milking inflation as shown in FIGURE 2.

The webs are made of open, low-density sheets of organic fibers described in full in U.S. Patent No. 2,958,593 issued Nov. 1, 1960, to Minnesota Mining and Manufacturing Company.

Briefly, the three-dimensional lightweight web material is formed of many interlaced, randomly disposed, flexibly, durable, tough organic fibers which exhibit substantial resiliency and strength upon prolonged subjection to water and fats. The fibers of the web material are firmly bonded together at points where they intersect and contact one another by globules of an organic binder thereby forming a three-dimensionally integrated structure. Abrasive particles are distributed within the web and firmly adhered by the binder globules at variously spaced points along the fibers. The many interstices between adjacent fibers remain substantially unfilled by the binder and abrasive particles, there being thus provided a composite structure of extremely low density having a network of many relatively large intercommunicated voids. These voids make up at least about three-fourths or more of the total volume occupied by the composite structure. The resulting lightweight extremely-open abrasive fibrous material is essentially nonclogging in nature, particularly when used in conjunction with liquids such as water and cleaning solutions. After use, the webs can be readily cleaned by simply washing with a cleansing solution.

In the preferred form, the web material is made of synthetic fibers such as nylon or polyesters because the uniformity and quality of such type of fibers can be closely controlled. Furthermore, fibers of this nature substantially retain their physical properties when wet with water or oils such as butterfat.

FIGURES 3 and 4 show the action of my new brush 10 in a milking inflation shown generally at 20. The inflation has a cup portion 20a, a milk tube portion 20b and an enlarged mouth portion 20c. As best shown in FIGURE 4, when the brush is inserted with a rotary motion into the cup portion of the milking inflation, the webs 14 fold backwardly on one another in supporting spiral relation.

It has been found that the abrasive sheet material from which the webs 14 are made, while very abrasive when dry, is much less severe when wetted with water or a liquid cleaning solution. It is important that the brush does not roughen or otherwise damage the internal surface of the rubber milking inflation since such roughening of the surface would enhance the absorption of fats by the rubber and speed up the deterioration of the rubber, as well as provide a breeding area for bacteria.

When the brush 10 is removed from the inflation 20, the resilient webs 14 again resume substantially their radial position, as shown in FIGURES 1 and 2, which enables the brush to be cleaned by washing and rinsing with water and/or a cleaning solution. The openness and low-density of the web material permit it to be easily and thoroughly cleaned in this manner.

FIGURE 5 shows a second embodiment of my invention wherein the brush 30 includes an upper brush portion 31 which is substantially the same as the upper brush portion shown in FIGURE 1 except that the bottom half of the upper brush portion has fewer radial webs 32. The intermediate brush portion shown for exemplification has half as many radial webs as the upper brush portion 31.

This facilitates insertion of the brush into inflations with tapered cup portions. Furthermore, this construction enables the wires comprising the middle portion of the central core to be wound spirally around one another to give added strength to the brush. The lower brush portion 33 is of conventional construction.

While my new brush is shown in its simplest form with a handle for hand washing operations, it is, of course, recognized that the brush may have a modified construction for quick attachment to the rotary drive of a motor without departing from the scope and spirit of the invention.

It is therefore understood that my invention is not confined to the particular construction and arrangement of parts herein illustrated and described, but embraces all such modified forms thereof as come within the scope of the following claims.

I claim:
1. A brush for cleaning milking machine inflations having teat-receiving cup portions and milk tube portions of smaller diameter, said brush comprising:
   (a) an elongate central core of substantially rigid material,
   (b) an upper brush portion having a plurality of substantially radially extending webs of open low-density abrasive fibrous, non-woven material secured to said core, said webs being flexible so as to fold backwardly on one another in overlapping supporting spiral relation when said upper brush portion is inserted with a rotary motion into the cup portion of a milking inflation, and
   (c) a lower bristle brush portion for insertion into the smaller diameter milk tube portion of the milking inflation for cleaning same.

2. The brush as specified in claim 1 including an intermediate webbed brush portion between said upper and lower portions, said intermediate portion having fewer radially extending webs than said upper portion to facilitate its insertion into a tapered section of the cup portion of an inflation.

References Cited

UNITED STATES PATENTS

| 127,754 | 6/1872 | Ford | 15—211 XR |
| 823,725 | 6/1906 | Hayden | 15—114 |
| 2,893,029 | 7/1959 | Vosbikian et al. | 15—223 XR |

FOREIGN PATENTS

| 291,620 | 6/1928 | Great Britain. |
| 352,274 | 7/1931 | Great Britain. |

DANIEL BLUM, *Primary Examiner.*